July 22, 1969  RYOSUKE YOKOTA ET AL  3,456,641
FLEXIBLE ENDOSCOPE FOR PHOTOGRAPHING DISEASED
PARTS IN CANCER DIAGNOSIS Filed Sept. 30, 1965  2 Sheets-Sheet 1

Ryosuke Yokota
Shigehiko Fuwa
Shinichi Kawashima
Yutaka Matsuno
INVENTOR.

BY George B. Anjeseck
Attorney

United States Patent Office 3,456,641
Patented July 22, 1969

3,456,641
FLEXIBLE ENDOSCOPE FOR PHOTOGRAPHING DISEASED PARTS IN CANCER DIAGNOSIS
Ryosuke Yokota, Yokohama-shi, Shigehiko Fuwa, Kawasaki-shi, and Shinichi Kawashima and Yutaka Matsuo, Tokyo, Japan, assignors to Tokyo Shibaura Electric Co., Ltd., Kawasaki-shi, Japan, a corporation of Japan
Filed Sept. 30, 1965, Ser. No. 491,734
Claims priority, application Japan, Sept. 30, 1964, 39/55,538; June 1, 1965, 40/31,902
Int. Cl. A61b 1/04
U.S. Cl. 128—4          2 Claims

ABSTRACT OF THE DISCLOSURE

A flexible endoscope for use in cancer diagnosis provided with means for conducting ultraviolet rays into a human body and irradiating diseased parts absorbing tetracycline. An ultraviolet rays intercepting filter in the instrument transmits only visible light rays emanating from the tetracycline of the diseased parts. Means for photographing the light rays intercepted by the filter are provided.

---

This invention relates to an apparatus for detecting diseased parts in cancer diagnosis, and more particularly to a novel apparatus for detecting diseased parts wherein an ultraviolet ray conductor is utilized to irradiate the diseased parts of the patient with ultraviolet rays so that the nature and property of the diseased parts are determined by the presence or absence of the luminescence produced by the stimulating action of ultraviolet rays.

As a means for detecting diseased parts in the coelom of a human body, gastroscopes and the like have been proposed. In these prior detecting apparatus a light or photoconductor consisting of a flexible fine tube has been utilized to irradiate the diseased parts of the patient with visible light rays and the appearance of the diseased parts has been observed by a miniature camera mounted on the extreme end of the fine tube or by directly observing the state of the diseased parts so that the prior apparatus have been useful to inspect the apparent cancerous parts but have not been effective to detect such diseased parts as those, the nature and property of which are not determined by observing the appearance thereof. For example, in the diagnosis of cancer of the stomach or other organs, detection thereof at an early stage is essential from the standpoint of effective remedy. However since the gastroscope and the like can examine only the surface appearance, it has not been effective to correctly determine conditions that cannot be diagnosed by their appearances, such as cancers of an early stage.

Accordingly, an object of this invention is to provide a novel apparatus for detecting diseased parts in cancer diagnosis wherein the diseased parts of the patient are irradiated with ultraviolet rays so that the nature of the diseased parts can be accurately determined by observing the visible light rays emanating from the diseased parts.

A further object of this invention is to provide a novel apparatus for detecting the diseased parts in cancer diagnosis having a remotely operated camera.

A still further object of this invention is to provide a new and improved apparatus for detecting the diseased parts in cancer diagnosis wherein visible light rays including ultraviolet rays are projected to detect the diseased parts so as to improve the detection of the nature thereof.

Another object of this invention is to provide a novel apparatus for detecting the diseased parts in cancer diagnosis wherein a core consisting of glass fibers is utilized as a conductor of light rays irradiating the diseased part of the patient, thus preventing attenuation of the light rays.

Other and further objects and advantages of the invention will be apparent from the following description taken in conjunction with the accompanying drawings, in which.

For its principle of operation, the present invention depends on the fact, well known in the art, that cancer cells, even at a very early stage selectively absorb compounds having a tetracycline base. These compounds emanate a yellowish fluorescence upon irradiation by ultraviolet rays.

Briefly stated, this invention provides an apparatus for detecting the diseased parts in cancer diagnosis including a light conductor consisting of a plurality of fine fibers adapted to conduct light rays ranging from ultraviolet rays to visible light rays and contained in a tube of an opaque substance, a source of light adapted to radiate at least said ultraviolet rays into said tube at one end of said light conductor, and a visible light detector to detect the visible light rays emanating from the diseased parts which are irradiated by light rays from the other end of said tube.

Figure 1:
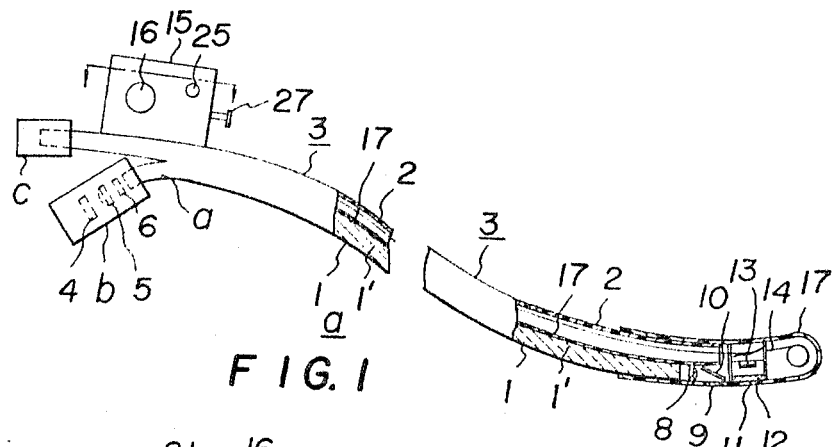
FIG. 1 is an elevational view, partly in section, of one embodiment of the apparatus for detecting the diseased parts in cancer diagnosis constructed in accordance with this invention.

Referring now to FIG. 1 of the accompanying drawings, a bundle or assemblage 1' of suitable fine glass fibers for conducting light rays ranging from ultraviolet rays to visible light rays is inserted in the longitudinal direction of a flexible tube 1 made of an opaque substance so as to constitute a light or photoconductor $a$. A hollow tube 2 made of a flexible substance is associated with the photoconductor $a$ in parallel therewith to form a composite member 3. One end of the composite member 3 is divided into the photoconductor $a$ and the hollow tube 2, the end of the photoconductor $a$ terminating in a sealed box $b$ containing an optical system whereas the hollow tube 2 terminates in a closure member $c$. The opposite end of the composite member 3 is sealed to a cap 7 which comprises the other closure member. The optical system contained in the box $b$ comprises a light source 4 such as an ultra-high pressure mercury discharge lamp, a condensing lens 5 adapted to collect or receive the light rays from the light source 4 and to focus them toward the cap 7 at the opposite end of the photoconductor $a$ and a filter 6 adapted to intercept visible light rays from the light rays emanated from the mercury discharge lamp.

Figure 3:
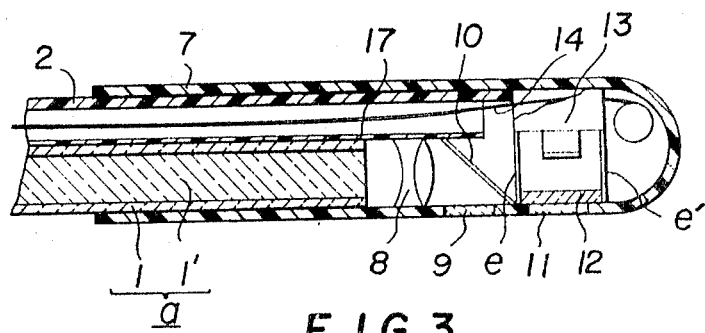
FIG. 3 is an enlarged sectional view of a cap portion of the apparatus shown in FIG. 1.

Referring to FIG. 3 which shows a large sectional view of the cap 7 shown in FIG. 1, there is provided a lens 8 located opposite to the end of photoconductor $a$ to collect the ultraviolet rays conveyed therethrough and a reflecting mirror 10 to reflect the ultraviolet rays collected by lens 8 and to project these rays to the diseased parts of the patient through a window 9 provided through the wall of cap 7. The visible light rays emanated from the diseased parts as a result of irradiation of ultraviolet rays are transmitted to a miniature camera 13 contained in the cap 7 through the other window 11 and a filter 12 which acts to intercept ultraviolet rays but permit visible light rays to pass. A photographic film 14 is disposed on the back of the camera 13. The film 14 is so arranged that it will not be exposed to any light rays other than those necessary for photographing the image of the diseased parts. For example, visible light rays emanated from the diseased parts and entering the inside of the cap 7 through the window 9 are intercepted by the reflecting mirror 10 before reaching the film 14. Further the camera 13 is shielded for undesirable light rays by barriers $e$ and $e'$ located on both sides of the camera. Thus the film 14 is positively protected against undesired incoming light rays, thus assuring a clear image of the diseased parts. The film 14 is successively fed to the focal point of the camera lens 13 by operating handles 16 provided with an external camera operating box 15 which is located close to the closure member $c$ of the hollow tube 2, as will be described later in more detail.

Figure 2:
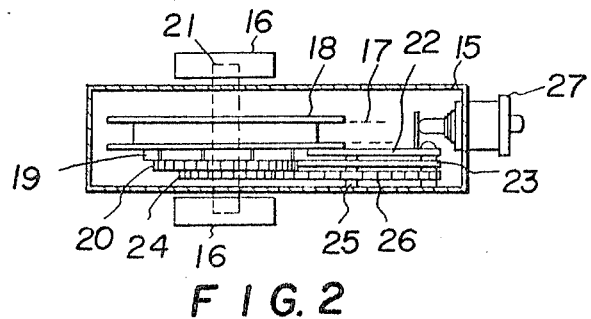
FIG. 2 shows the internal construction of a camera operating box utilized in the apparatus shown in FIG. 1.

As shown by the plan view of FIG. 2 the camera operating box 15 contains a take-up spool 18 for a rigid band 17 of steel, for example, for pulling the film 14, a grooved clutch wheel 19 adapted to maintain stationary each of the successive sections of the film 14 and a gear 20 for preventing reverse rotation, said spool 18, clutch wheel and gear being mounted on a shaft 21 provided with operating handles 16. There are also provided in the box 15 a lever 22 having a pawl (not shown) normally urged to engage the slot of the clutch wheel 19, a lever 23 having a pawl which is normally urged by a spring (not shown) to engage the teeth of the gear 20 to prevent reverse rotation thereof and a dial wheel 26 which engages a gear 24 fixed to the shaft 21 to indicate the member of exposed film sections through a small window 25 at one side of the operating box 15. At one end of the box 15, a push button 27 is provided to disengage the pawled lever 22 from the clutch wheel 19 when it is desired to advance the spool 18 and hence the film by one step or section.

It is preferable to form the thin glass fibers of said photoconductor $a$ into a bundle 1' of composite fine fibers each comprising a core made of optical glass of the barium base having a composition by weight of $SiO$ 52.5%, $K_2O$ 11.0%, $ZnO$ 6.1%, $BaO$ 29.0% and $Al_2O_3$ 1.4%, a refraction index of about 1.596 at a wavelength of 365 $m\mu$ and a superior transmitting property for the light rays at this wavelength and a coating made of high purity soda lime glass having a composition by weight of $SiO_2$ 68.97%, $Al_2O_3$ 3.07%, $Na_2O$ 16.24%, $CaO$ 9.17% and $MgO$ 2.55%, substantially the same coefficient of thermal expansion as the glass of the core and a relatively low refraction index, say for example 1.520, at a wavelength of 365 $m\mu$. The bundle of composite fibers is then inserted into a tube made of a flexible and opaque substance such as black rubber, a black vinyl compound and the like. The hollow tube 2 extending along the photoconductor $a$ is also made of black rubber, but it is not always required to be made of an opaque substance. For example, the tube may be composed of a hollow glass tube which is properly treated to intercept visible light rays. The relative arrangement of the photoconductor $a$ and the hollow tube 2 is not limited to the particular arrangement depicted. Especially when an automatic camera is utilized as the camera 13, the hollow tube may be omitted.

In operation, the light rays emanated from the light source 4 are collected by the condensing lens 5 and the visible light rays contained therein are intercepted by the filter 6 so that only the ultraviolet rays are projected on the photoconductor $a$. The ultraviolet rays are then conveyed to the opposite end of the photoconductor $a$ through repeated total reflections in the thin glass fibers thereof having a high refraction index and a high light transmittance, and collected by the condensing lens 8, reflected by the reflecting mirror 10 and finally projected upon the diseased parts through the window 9. If the diseased parts contain a substance that luminesces by the stimulation of the ultraviolet rays, the visible light rays emanated thereby will be received by the detecting device contained in the cap 7 through the other window 11. In this case, as the ultraviolet rays of the incoming light rays are intercepted by the filter 12, only visible light rays are sensed by the film 14 of the camera 13. It is, of course, to be understood that prior to the exposure of the film in the manner described above, the apparatus for detecting the diseased parts is set in the desired position and the push button 27 mounted on the camera operating box 15 is depressed to disengage the clutch and then the film 14 is advanced by one section by the handle 16. In this manner where the part to be examined contains a substance that luminesces when stimulated by the ultraviolet rays or where such luminous substance is caused to be adsorbed by or adhered to said part, it is possible to readily determine the surface condition, nature and property of the diseased parts of the patient. For example, in the diagnosis of stomach cancer, the patient is administered an aqueous solution or brine containing tetracycline which emanates a yellowish fluorescence when irradiated with ultraviolet rays, and then the apparatus for detecting the diseased parts constructed in accordance with this invention is inserted into the stomach whereby the state of cancer therein can be readily and accurately determined even at an early stage. As has been previously pointed out, it is well known in the art, that cancer cells selectively adsorb compounds of the tetracycline base, and these compounds emanate a yellowish fluorescence upon irradiation by ultraviolet rays. Consequently even when the presence of cancer cells is difficult to detect by their appearance, they selectively adsorb compounds of the tetracycline base and emanate fluorescence when irradiated by ultraviolet rays, so that it is very easy to determine the condition and nature of cancer by observing the distribution and quantity of the adsorbed tetracycline, which is quite advantageous for the discovery, diagnosis and remedy of cancer at an early stage.

Figure 4:
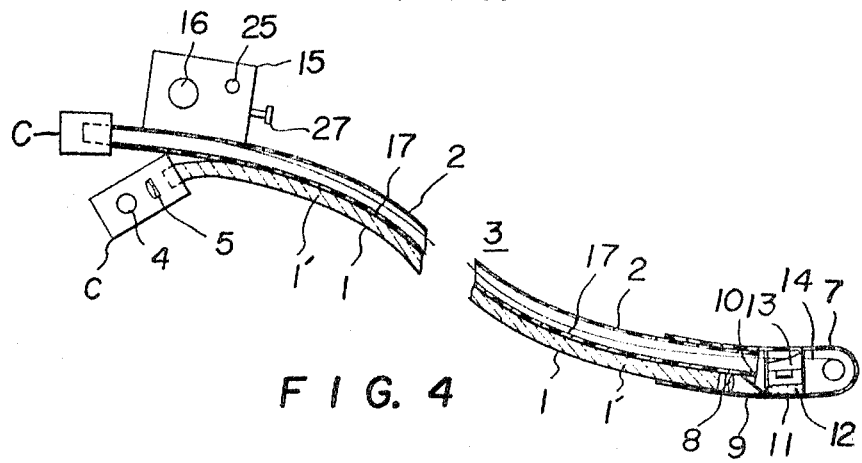
FIG. 4 shows an elevational view, partly in section, of a modification of this invention.

FIG. 4 is a diagrammatic representation of a modified embodiment of this invention wherein mixtures of ultraviolet rays and visible light rays are used as a source of light and wherein like portions are designated by the same reference numerals as in FIG. 1. In this embodiment the filter 6 (shown in FIG. 1) for intercepting visible light rays of the optical system contained in the box $b$ provided at one end of the photoconductor $a$ is eliminated so that visible light rays from a light source 4 such as a high pressure mercury discharge lamp including ultraviolet rays are collected by a lens 5 and projected on one end of a photoconductor $a$. The mixed light rays are then transmitted to the opposite end of the photoconductor $a$ after a number of total reflections are repeated in the bundle 1' of thin glass fibers composing the photoconductor $a$, and then projected upon the diseased parts through a lens 8, a reflecting mirror 10 and a window 9. The ultraviolet rays in the mixed light rays function in the same manner as those of the apparatus shown in FIG. 1 and the visible light rays transmitted are added to those emanated from the diseased parts thus greatly improving contrast as well as the sensitivity of the camera 13 contained in the cap 7.

While in the foregoing description, the application of the novel apparatus to the diagnosis of stomach cancer has been described it will be obvious to those skilled in the art that this invention is by no means limited to these particular applications and that the invention can be applied with equal advantages to determine the nature or appearance of various materials which have a property of selectively absorbing of a substance capable of emanating visible light rays when stimulated by ultraviolet rays or to determine whether or not a given material contains a special ingredient which luminesces when stimulated by ultraviolet rays.

It should therefore be understood that this invention is not limited to the specific details of construction and arrangement herein illustrated, and that changes and modifications may be made by one skilled in the art without departing from the true spirit and scope of the invention.

What is claimed is:

1. A flexible endoscope for detecting diseased parts in cancer diagnosis comprising a photoconductor including a tube made of a flexible and opaque material and a bundle of thin glass fibers extending through said tube, a source of ultraviolet rays disposed at one end of said tube to radiate ultraviolet rays which are conveyed through the fibers from one end of the other end of said tube, a sealed closed member connected to the other end of said tube having a first window through which the ultraviolet rays are projected toward a suspected body organ to be diagnosed and a second window adjacent to the first window, the second window being adapted to receive light rays reflected from the suspected body organ, an optical system disposed in the photoconductor at said other end of said tube to cause ultraviolet rays to be directed out through the first window, onto said suspected body organ and a detector located in said closed member at a position opposite to the second window and having a camera and an ultraviolet filter attached to the second window, the filter acting to intercept the ultraviolet rays but permit visible light rays to be passed to the camera so that any tetracycline compound contained in said suspected body organ, will, if cancerous, emit a characteristic detectable signal.

2. The apparatus for detecting diseased parts in cancer diagnosis according to claim 1 wherein said thin glass fibers inserted in said photoconductor comprise compounded thin glass fibers each consisting of a core made of glass having a composition by weight of

|          | Percent |
|----------|---------|
| $SiO_2$  | 52.5    |
| $K_2O$   | 11.0    |
| $ZnO$    | 6.1     |
| $BaO$    | 29.0    |
| $Al_2O_3$| 1.4     | and a refraction index of about 1.596 at a wavelength of 365 m$\mu$ and a coating made of a glass having a composition by weight of

|          | Percent |
|----------|---------|
| $SiO_2$  | 68.97   |
| $Al_2O_3$| 3.07    |
| $Na_2O$  | 16.24   |
| $CaO$    | 9.17    |
| $MgO$    | 2.55    | and having substantially the same coefficient of thermal expansion as the glass of said core and a refraction index of about 1.520 at a wavelength of about 365 m$\mu$.

References Cited

UNITED STATES PATENTS

| 3,253,524 | 5/1966  | Ashizawa et al. | 128—4 XR |
| 3,270,641 | 9/1966  | Gosselin        | 128—4 XR |
| 3,327,119 | 6/1967  | Kamentsky       | 250—83.3 |
| 3,357,433 | 12/1967 | Fourestier et al. | 128—397 |

RICHARD A. GAUDET, Primary Examiner

KYLE L. HOWELL, Assistant Examiner

U.S. Cl. X.R.

128—397; 250—71; 350—96; 356—51